United States Patent
Conn et al.

(10) Patent No.: US 9,403,532 B2
(45) Date of Patent: Aug. 2, 2016

(54) CLOSED-LOOP TRANSMISSION INTEGRATION WITH FORWARD AND/OR REVERSE ASSIST SYSTEM

(75) Inventors: Randall S. Conn, Avon, IN (US); Mark A. Rains, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 909 days.

(21) Appl. No.: 12/833,172

(22) Filed: Jul. 9, 2010

(65) Prior Publication Data

US 2012/0010791 A1  Jan. 12, 2012

(51) Int. Cl.
*B60T 8/24* (2006.01)
*G05D 1/00* (2006.01)
(Continued)

(52) U.S. Cl.
CPC .............. *B60W 30/06* (2013.01); *B60W 10/02* (2013.01); *B60W 10/06* (2013.01); *B60W 10/10* (2013.01); *B60W 10/184* (2013.01); *B60W 2050/002* (2013.01); *B60W 2050/0021* (2013.01); *B60W 2050/0074* (2013.01); *B60W 2510/0604* (2013.01); *B60W 2510/104* (2013.01); *B60W 2540/04* (2013.01); *B60W 2550/10* (2013.01);
(Continued)

(58) Field of Classification Search
CPC .. B60K 31/047; B60K 31/107; B60K 28/165; B60W 2550/142; B60W 2710/0605; B60W 10/11; B60W 30/18172; B60W 2710/02; B60W 2710/021–2710/029; B60W 2710/605; B60W 2710/0611; B60W 2710/1038; B60W 30/06; B60W 10/02; B60W 10/06; B60W 10/10; B60W 10/184; B60W 2050/002; B60W 2050/0074; B60W 2510/0604; B60W 2540/04; B60W 2550/10; B60W 2710/025; B60W 2710/0644; B60W 2710/1005; F16H 61/0213; F16H 61/0223; F16H 61/0227; F16H 61/0234; F16H 61/0237; F16H 61/21; F16H 2061/213; F16H 2061/216
USPC ........ 701/54, 93–96, 55, 67, 68, 87; 340/901; 180/167–170, 364
See application file for complete search history.

(56) References Cited

U.S. PATENT DOCUMENTS 5,035,158 A  7/1991 Leigh-Monsteves
6,067,495 A * 5/2000 Fliearman et al. .............. 701/55
(Continued)

FOREIGN PATENT DOCUMENTS

JP  2212231 A  8/1990

OTHER PUBLICATIONS

ISA/KR, "PCT Notification of Transmittal of the International Search Report and Written Opinion of the International Searching Authority, or the Declaration", Dated: Feb. 28, 2012;.

*Primary Examiner* — Jeffrey Shapiro
(74) *Attorney, Agent, or Firm* — Taft Stettinius & Hollister LLP; Stephen F. Rost (57) ABSTRACT

The present invention provides a method of reducing the output speed of a transmission in a vehicle, whereby the transmission includes a speed sensor and a controller and the vehicle includes a proximity sensor. The method includes measuring the output speed with the speed sensor and comparing the measured output speed to an output speed threshold. The controller receives throttle percentage and compares the throttle percentage to a throttle threshold. The method further includes receiving an input signal from the proximity sensor and comparing the input signal to a signal threshold. The output speed of the transmission can be controlled based on the values of the measured output speed, throttle percentage, and input signal.

28 Claims, 6 Drawing Sheets

(51) Int. Cl.
*G05D 5/00* (2006.01)
*G06F 7/00* (2006.01)
*G06F 17/00* (2006.01)
*B60W 30/06* (2006.01)
*B60W 10/02* (2006.01)
*B60W 10/06* (2006.01)
*B60W 10/10* (2012.01)
*B60W 10/184* (2012.01)
*B60W 50/00* (2006.01)
*F16H 61/00* (2006.01)

(52) U.S. Cl.
CPC .. *B60W 2710/025* (2013.01); *B60W 2710/0644* (2013.01); *B60W 2710/1005* (2013.01); *B60W 2710/1038* (2013.01); *F16H 61/0059* (2013.01); *F16H 2312/16* (2013.01)

(56) References Cited

U.S. PATENT DOCUMENTS

| | | | |
|---|---|---|---|
| 6,324,465 B1* | 11/2001 | Teramura | B60K 31/0008 180/170 |
| 6,370,470 B1* | 4/2002 | Yamamura | B60K 31/0008 180/170 |
| 7,389,176 B2 | 6/2008 | Kadono et al. | |
| 7,503,874 B2 | 3/2009 | Tomaschko et al. | |
| 7,517,298 B2* | 4/2009 | Ortmann | 477/3 |
| 7,769,498 B2* | 8/2010 | Isaji | B60K 28/066 180/167 |
| 8,694,218 B2* | 4/2014 | Shultz et al. | 701/56 |
| 2002/0044047 A1* | 4/2002 | Miyakoshi et al. | 340/435 |
| 2002/0055813 A1* | 5/2002 | Adachi et al. | 701/96 |
| 2004/0145238 A1* | 7/2004 | Seto | B60T 7/22 303/193 |
| 2005/0209747 A1* | 9/2005 | Yakes | B60K 6/46 701/22 |
| 2005/0267665 A1* | 12/2005 | Iwatsuki | B60T 7/12 701/70 |
| 2006/0117742 A1* | 6/2006 | Bellinger et al. | 60/288 |
| 2006/0265115 A1* | 11/2006 | Etori et al. | 701/96 |
| 2007/0076593 A1* | 4/2007 | Sakurai | B60W 50/0205 370/219 |
| 2007/0185639 A1* | 8/2007 | Osborn et al. | 701/71 |
| 2007/0250241 A1* | 10/2007 | Tanimichi | B60T 7/22 701/70 |
| 2008/0022969 A1* | 1/2008 | Frenz | F02D 9/02 123/347 |
| 2008/0221763 A1* | 9/2008 | Cawthorne et al. | 701/62 |
| 2009/0118963 A1* | 5/2009 | Heap | B60K 6/365 701/99 |
| 2009/0164082 A1* | 6/2009 | Kobayashi | B60K 31/0008 701/94 |
| 2009/0314110 A1* | 12/2009 | Mueller et al. | 74/15.66 |
| 2010/0222958 A1* | 9/2010 | Kobayashi | B60G 17/0195 701/31.4 |
| 2010/0313849 A1* | 12/2010 | Stoner et al. | 123/350 |
| 2011/0093174 A1* | 4/2011 | O'Leary et al. | 701/64 |

* cited by examiner

CLOSED-LOOP TRANSMISSION INTEGRATION WITH FORWARD AND/OR REVERSE ASSIST SYSTEM

BACKGROUND

The present invention relates to a system and method of transmission control integration, and in particular to a method of using transmission control to prevent a vehicle from contacting an object in the vehicle's path of movement.

Operating a motor vehicle can be challenging especially when attempting to back the vehicle into a parking space, for example. To assist drivers with these challenges, a conventional vehicle can include one or more sensors on the front or rear bumper thereof. These sensors, also commonly referred to as parking sensors or proximity sensors, can detect unseen obstacles that may be present in the path of the vehicle. In general, parking sensor systems can use ultrasonic proximity sensors embedded in the front or rear bumper to measure the distance to an approaching object. The sensors measure the time taken for each sound pulse to be reflected back to a receiver.

Depending on the vehicle speed and distance between the sensor and the object, the system will alert the driver by a visual and/or audible signal. The signal can indicate the direction and proximity of the object to the vehicle. In some instances, the system can be deactivated manually or based on the vehicle speed. For instance, if the vehicle is moving in reverse at 25 mph, the system may not be active until the vehicle slows to a speed below 5 mph.

In terms of feedback, one conventional means is through an audible signal. The audible signal can be in the form of a "beep" or tone. The frequency of beeps, for example, can indicate to the driver how close the object is to the vehicle. In one instance, the number of generated audible signals may increase as the vehicle moves closer to the object. In another instance, a continuous tone may be generated when the distance between the vehicle and object falls within a certain threshold.

Another conventional means of feedback is a visual signal. The visual signal can be in the form of one or more light-emitting diodes (LEDs) that illuminate as the vehicle approaches an object. The visual signal may include four LEDs, for example, such that as the vehicle approaches the object an additional LED is illuminated. In another example, each of the LEDs may be a different color such that each color represents a distance between the vehicle and object.

The conventional parking sensors, however, do have shortcomings. First, the detection system requires the driver to be alerted and react based on the generated signal. If a driver fails to react, the vehicle may still crash into the detected object. Second, if the driver is disabled or unable to be alerted by the detection system, then the detection system is unable to assist with parking and/or preventing collisions. Thus, the detection system has limited utility in its current form. Also, the detection system can be an annoyance to those drivers who either do not want assistance from the system or want to override the system. For example, a driver who is backing up to a boat trailer may wish to disable the detection system, but conventional vehicles do not allow drivers to disable the detection system.

Therefore, a need exists for an improved detection system that overcomes the disadvantages of the prior art and which can be implemented using transmission software.

SUMMARY OF THE INVENTION

In one exemplary embodiment of the present invention, a method is provided for reducing the output speed of a transmission in a vehicle. The vehicle includes a proximity sensor and a transmission, wherein the transmission has an output speed sensor and a controller. The method includes measuring the output speed with the output speed sensor and comparing the measured output speed to an output speed threshold. The controller receives throttle percentage and compares the throttle percentage to a throttle threshold. The method further includes receiving an input signal from the proximity sensor and comparing the input signal to a signal threshold. The output speed of the transmission can be controlled based on the values of the measured output speed, throttle percentage, and input signal.

In one form of this embodiment, the vehicle can include a user input switch such that when the switch is enabled, the controller can reduce the output speed of the transmission. In another form thereof, the method can also include determining whether the controller can limit the speed or torque of an engine of the vehicle. When the controller is able to control engine speed or torque, the controller can send signals to an engine controller to reduce engine speed or torque. Alternatively, when the controller cannot control engine speed or torque, the method includes calculating a transmission gear ratio. Based on the transmission gear ratio, the controller can reduce the transmission output speed by selectively filling an impeding clutch and selectively trimming an applied clutch.

In another embodiment, a method is provided for using a transmission to prevent a moving vehicle from contacting an object in the path of the moving vehicle. In this embodiment, the transmission can have a controller and speed sensor and the vehicle can have a proximity sensor. The method includes determining whether a user input switch is enabled, receiving a signal from the proximity sensor and comparing the signal to a signal threshold. The method also includes measuring output speed with the speed sensor and comparing the measured output speed to an output speed threshold and receiving throttle percentage with the controller and comparing the throttle percentage to a throttle threshold. The output speed of the transmission can be controlled based on the values of the measured output speed, throttle percentage, and received signal from the proximity sensor.

In a different embodiment, a method is provided for using a transmission to reduce vehicle speed as it approaches an object. The transmission can have a transmission controller and speed sensor and the vehicle can have a proximity sensor and a brake controller. The method can include enabling a user input switch and detecting the object with the proximity sensor. A signal can be received from the proximity sensor and compared to a signal threshold. The speed sensor can measure output speed and the measured output speed can be compared to an output speed threshold. The transmission controller can receive throttle percentage and compare it to a throttle threshold. The method further includes determining whether the transmission controller or brake controller has priority for controlling vehicle speed. Lastly, the method includes controlling the vehicle speed as it approaches the object.

An advantage associated with the various embodiments of the method described above is that a transmission controller can control vehicle speed without driver input. For instance, if a vehicle is backing into a parking space in a parking garage, the proximity sensor on the vehicle can detect whether an object is in the path of the moving vehicle. Once the object is detected, the sensor can send a signal to the transmission controller which can either communicate directly with the engine controller to reduce engine speed or torque or control the transmission output. In other words, if a driver is distracted and does not see the object, the transmission can reduce the vehicle speed to either prevent the vehicle from contacting the object or at least reduce the vehicle speed at which such contact occurs.

Also, in the event the detection system sends audible or visual warning signals to the driver, but the driver is unable to process or interpret the warning signals, the transmission is capable of reducing vehicle speed to prevent or reduce the severity of a collision. Another advantage with the inventive method is the ability of the driver to disable the detection system. A switch, for example, can be incorporated into the dashboard of the vehicle which allows the driver to disable the proximity sensors and thereby disable the transmission from reducing the vehicle speed. This may be important if the driver is backing the vehicle up to a boat trailer, for example, and the trailer hitch is located adjacent to the proximity sensors. The driver intends to place the rear bumper of the vehicle in close proximity to the trailer, and therefore the detection system is unnecessary.

The method has other advantages as well. For example, if a driver is backing into a driveway and a child or animal is in danger of being hit by the moving vehicle, the transmission can reduce the vehicle speed to avoid hitting the child or animal. Likewise, in the above example of the parking garage, the transmission can prevent the vehicle from backing into a pillar and causing damage to the vehicle. Thus, there are cost advantages associated with the present invention.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1A:
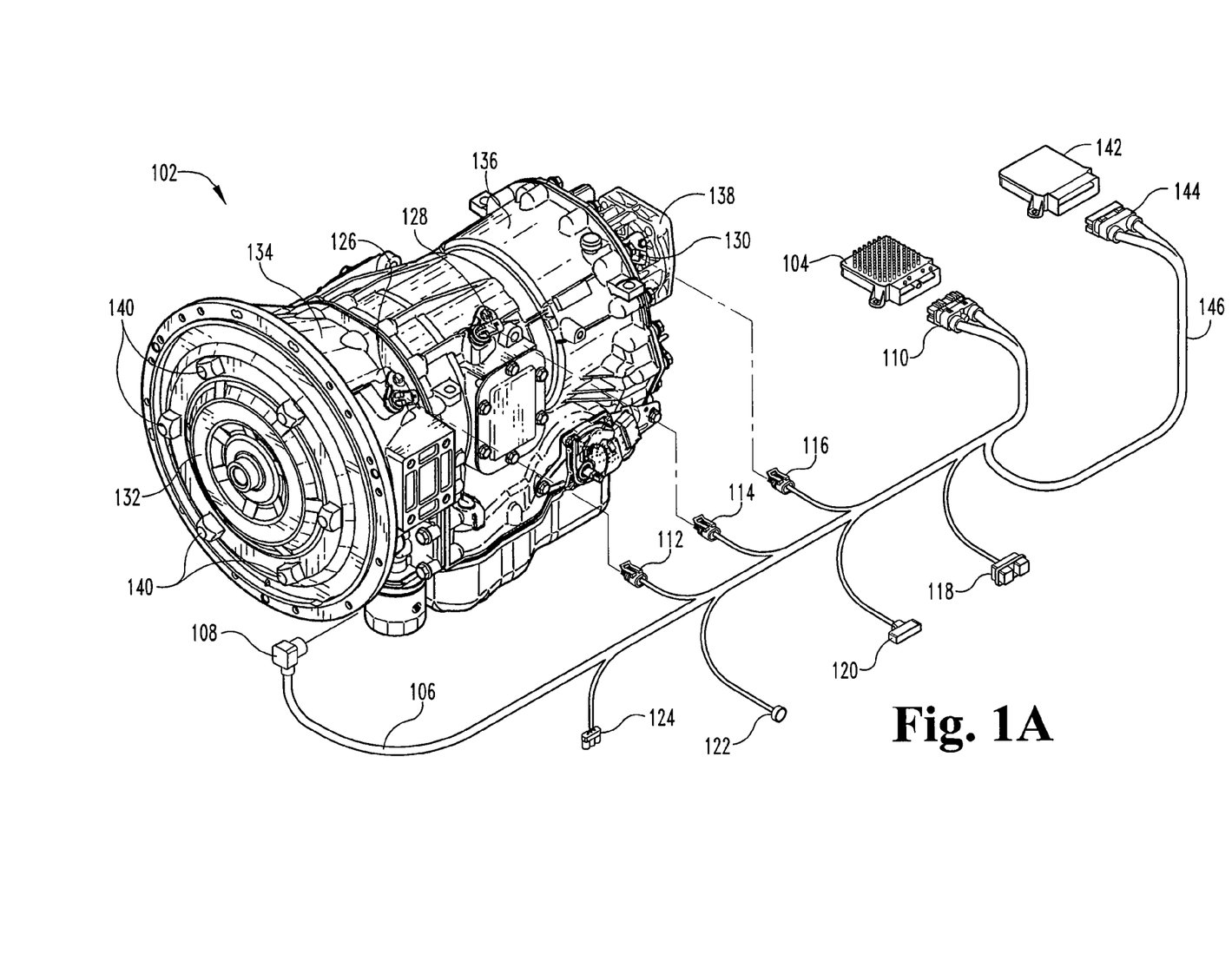
FIG. 1A is a perspective exploded view of one embodiment of a transmission coupleable to a controller, brake controller, and proximity sensor via a wiring harness.

The present invention relates to transmission software which controls the operation of a transmission in a vehicle. With reference to FIG. 1A, an exemplary embodiment of a transmission setup is provided. A transmission 102 is shown in FIG. 1A with a controller 104, i.e., transmission control module ("TCM"). Software is downloaded to the TCM 104 and a wiring harness 106 couples the TCM 104 to the transmission 102. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1A, for example, an input speed sensor connector 112 couples to an input speed sensor 126 of the transmission 102. The input speed sensor 126 can measure the input speed of the transmission, which is the same as engine speed. Likewise, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a vehicle connector 118 (e.g., Vehicle Interface Module ("VIM") connector), a throttle input source connector 120, and a throttle position sensor (TPS) connector 124.

The harness 106 can also be coupled to a proximity sensor via a proximity sensor connector 122. One example of a conventional proximity sensor is the DEI 9401T parking sensors from Directed Electronics, Inc. The proximity sensor may be mounted to either the front or rear bumper of a vehicle, although one skilled in the art can appreciate that the sensor may be mounted at other locations along the vehicle. During operation, the sensor can communicate with the TCM 104 by passing signals through a wire (not shown) that is disposed in the wiring harness 106.

A brake controller 142 can also be coupled to the TCM 104 via a wiring harness 146. The brake controller harness 146 can be coupled to the main wiring harness 106. At one end of the brake controller harness 146, for example, a connector 144 can couple to the brake controller 142. One example of a brake controller 142 is the OnGuard™ from Meritor WABCO (www.meritorwabco.com). The brake controller 142 is capable of controlling vehicle braking, and is responsive to driver input via the brake pedal.

As noted, the transmission 102 includes the input speed sensor 126, turbine speed sensor 128, and output speed sensor 130. The transmission 102 mounts to an engine (not shown) by coupling a converter housing 134 of the transmission 102 to a bell housing (not shown) of the engine (not shown). A torque converter 132 of the transmission 102 includes a plurality of lugs 140 that couple to a flex plate (not shown) via flex plate bolts (not shown). During operation, the engine rotates the torque converter 132 and the input speed sensor 126 detects the rotational speed of the torque converter 132. The torque converter 132 can include ribs or protrusions (not shown) that protrude from the surface of the torque converter 132 and which the input speed sensor 126 measures during each revolution.

The transmission 102 can also include a main case or housing 136 that encloses clutch plates and reaction plates, gears, hubs, pistons, shafts, and other transmission components. The transmission 102 can further include a turbine shaft (not shown) which rotates various clutches in the transmission. A gear or tonewheel (not shown) can be coupled to the turbine shaft (not shown) such that the turbine speed sensor 128, which couples to the main case or housing 136, measures the rotational speed of the gear or tonewheel (not shown). Other transmissions can include alternative ways known to the skilled artisan for measuring turbine speed.

In one embodiment, the transmission 102 includes an output shaft (not shown) which is enclosed by a rear cover 138 of the transmission 102. The output shaft (not shown) can couple to an output yoke (not shown) or other connection means. The output yoke, for example, couples the output of the transmission 102 to a driveline of the vehicle. To measure the output speed of the transmission 102, the output speed sensor 130 can couple to the rear cover 138. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft. Thus, over a given period of time, the output speed of the transmission 102 is measured.

A transmission software program can be downloaded to the TCM 104 and include one or more shift schedules. Other mini-programs can be included in a software program for directing the TCM 104 how to control the transmission 102 based on a vehicle's driving condition. The downloaded software is implemented by sending signals through the wiring harness 106 to control the transmission 102. The TCM 104 also receives measurement data from the transmission 102 such as, for example, input speed from the input speed sensor 126, turbine speed from the turbine speed sensor 128, and output speed from the output speed sensor 130. In an embodiment in which the transmission does not include a torque converter 132, the transmission may have only an input speed sensor 126 and output speed sensor 130. The TCM 104 can also calculate various parameters including transmission gear ratio or range, which is typically the ratio of input speed to output speed. In an embodiment in which the transmission 102 has a torque converter 132, the transmission gear ratio or range can also be determined by the ratio of turbine speed to output speed.

The TCM 104 also receives throttle percentage from a throttle input source, which can be coupled to an engine control module (ECM) for transmitting throttle data over a datalink. Examples of a conventional datalink include J1587 datalink, J1939 datalink, IESCAN datalink, Hardwire TPS (throttle position sensor) to TCM, and Hardwire PWM (pulse width modulation) to TCM. Unlike engine torque data, for example, which is communicated from the ECM to the TCM, throttle data is communicated over the datalink and is not limited to a particular engine/transmission configuration. Instead, the datalink can be adapted to most vehicle setups.

Figure 2:
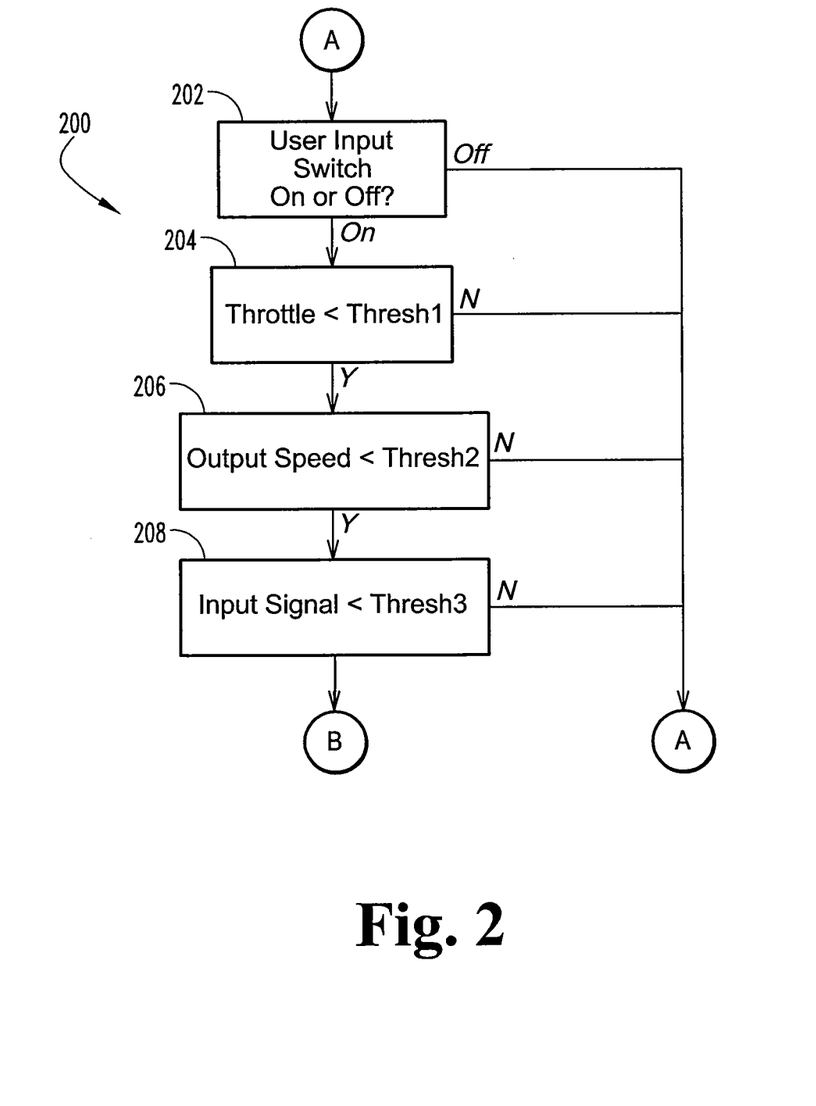
FIG. 2 is a flowchart of an embodiment for enabling a closed-loop integrated obstacle-detecting software system.

With the TCM 104 capable of being coupled to the ECM, the brake controller 142, and the proximity sensor, an inventive method for controlling vehicle speed through the transmission has been developed. In FIG. 2, an exemplary method 200 is provided in which the TCM 104 can control vehicle speed. In this embodiment, the TCM 104 can determine whether to enable a software program to assist with controlling vehicle speed (hereinafter the program is referred to as "assistance program"). Before enabling the assistance program, there are several calculations and decisions made by the TCM 104. First, in block 202, the TCM 104 determines whether the driver, for example, wants to enable the assistance program. As described above, there may be instances in which the driver does not want the transmission to control the vehicle speed. Thus, the driver may have access to a switch on the vehicle dashboard, for example, that can enable or disable the assistance program. Alternatively, the switch may also be disposed in other locations of the vehicle. If the switch disables the assistance program, the TCM 104 cannot perform the method 200 until it is enabled.

In block 204, the percentage of engine throttle is transmitted to the TCM 104. The TCM 104 then compares the throttle percentage to a throttle threshold value "Thresh1" to determine if the throttle is within a range in which the method 200 can be enabled. For example, in one embodiment, the method 200 may not be enabled until the throttle percentage is below 20%. In other embodiments, the throttle percentage may need to be below 10% or 15% before the method 200 is enabled. Thresh1 can be any percentage, however, and when the throttle percentage is below Thresh1 the method 200 can be enabled. Until the throttle percentage is below Thresh1, the method 200 cannot be enabled.

In block 206, the transmission output speed is measured by the output speed sensor 130. The measured output speed is transmitted to the TCM 104, which then compares the measured output speed to an output speed threshold value "Thresh2". Since the TCM 104 controls the transmission to reduce the vehicle speed, the transmission output speed needs to be below the threshold value "Thresh2" to enable the method 200. The threshold value "Thresh2" can be any value. In one embodiment, "Thresh2" can be 500 RPM. In another embodiment, "Thresh2" can be 250 RPM or less. The threshold value "Thresh2" will likely be small so that if the method 200 is enabled, the TCM 104 can effectively reduce the output speed as quickly as possible.

In block 208, the method 200 can be enabled when an input signal is received by the TCM 104 and the received signal satisfies a third threshold condition, i.e., "Thresh3." The input signal is generated by the proximity sensor disposed on the front and/or rear bumper of the vehicle. In one embodiment, there may be a plurality of proximity sensors. For example, there may be one or more sensors on the front bumper and one or more sensors on the rear bumper. The proximity sensor can be any conventional sensor that detects the presence of an object that may be seen or unseen by the driver of the vehicle.

The input signal generated by the proximity sensor can communicate a distance between the sensor and the detected object. Once the TCM 104 receives the input signal, the input signal is compared to threshold value "Thresh3." "Thresh3" is a distance value and can be set at any value. For instance, the proximity sensor may detect an object once the object is within 10 feet of the vehicle. The input signal transmitted by the sensor will likely be a distance value which is compared to the threshold value "Thresh3." If "Thresh3" is set as 5 feet, for example, the method 200 cannot be enabled until the distance transmitted by the proximity sensor is less than 5 feet. The threshold value "Thresh3" can be set at a value greater than or less than 5 feet.

Figure 3:
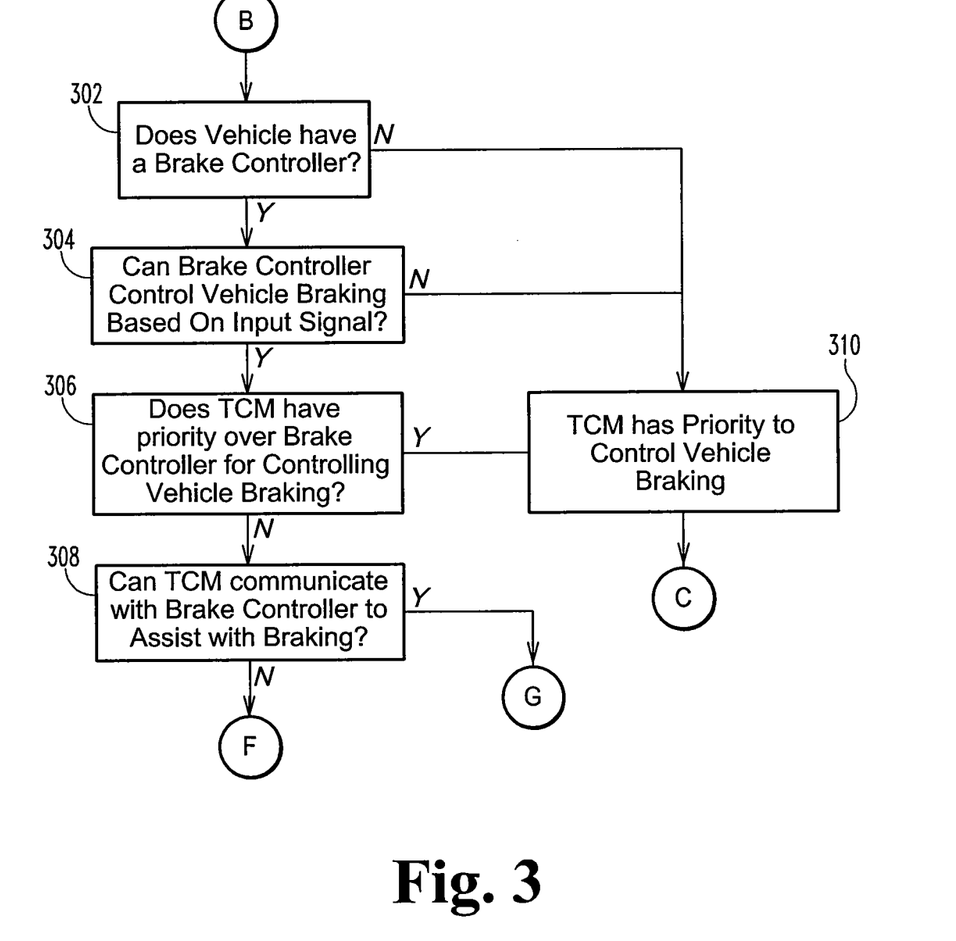
FIG. 3 is a flowchart of an embodiment for detecting priority for controlling the system of FIG. 2.

Once the user input switch is enabled and the conditions in blocks 204, 206, and 208 are satisfied, the TCM 104 has several more logic steps to make before it can control the vehicle speed. Turning to FIG. 3, a determination is made in block 302 whether the vehicle has a brake controller 142. In the event there is no brake controller 142, it is determined in block 310 that the TCM 104 has priority or control over vehicle braking. However, for clarity purposes, the TCM 104 does not control the vehicle brakes and therefore it is somewhat misleading to note that the TCM 104 has priority over vehicle braking. Instead, if it is determined in block 310 that the TCM 104 has control over vehicle braking, the TCM 104 has control over the output speed of the transmission 102 and therefore dictates vehicle speed on this basis.

Figure 7:
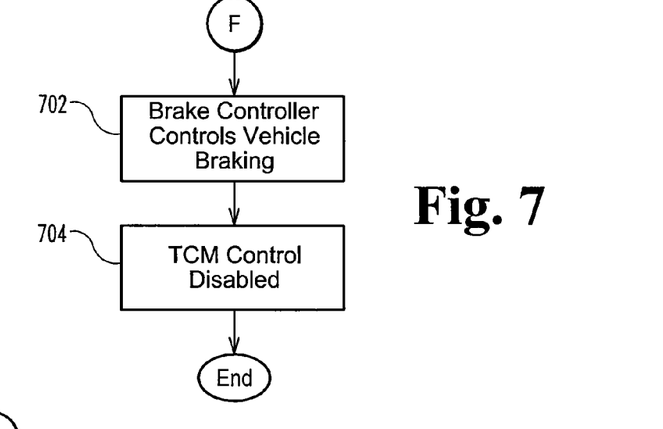
FIG. 7 is a flowchart of a different embodiment for controlling the output of a transmission with a brake controller.

If it is determined that the vehicle has a brake controller 142 (i.e., block 302), a determination is made in block 304 whether the brake controller 142 is capable of controlling vehicle braking (i.e., block 304) based on input from the proximity sensor. If the conditions set forth in blocks 302 and 304 are met, a determination is made whether the brake controller 142 has priority over the TCM 104 for controlling vehicle speed (i.e., block 306). Again, the brake controller 142 controls vehicle speed through the brake system on the vehicle and the TCM 104 controls vehicle speed through the performance of the transmission 102. In block 306, if it is determined that the brake controller 142 has priority over the TCM 104 for controlling vehicle speed, then the brake controller 142 can control vehicle speed via the brakes. As such, method 200 continues to block 308 to determine whether the TCM 104 can assist the brake controller 142 with controlling vehicle braking and speed. If the TCM 104 is unable to communicate with the brake controller 142, a determination is made in block 702 (FIG. 7) that the brake controller 142 controls vehicle braking. In this embodiment, the TCM 104 is unable to control vehicle speed and the method 200 is disabled in block 704.

Figure 1B:
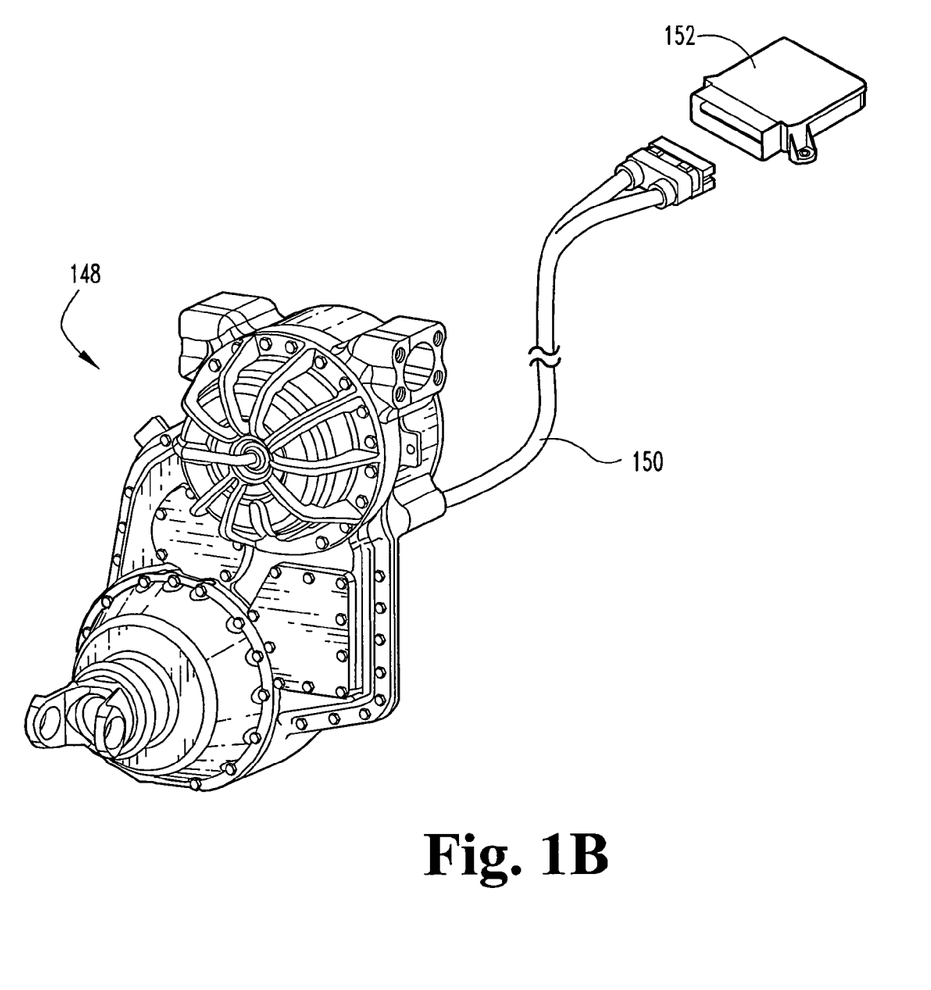
FIG. 1B is a perspective view of a transfer case and controller.

Returning to FIG. 3, a determination is made in blocks 306 and 310 whether the TCM 104 has priority to control vehicle braking and speed. If it is determined that the TCM 104 has priority, another determination is made in block 402 (FIG. 4) whether the transmission has a transfer case for four-wheel drive applications. Turning to FIG. 1B, an embodiment of a transfer case 148 is provided with a transfer case controller 152. The transfer case 148 and transfer case controller 152 are coupled by a harness or wire 150. The transfer case controller 152 is also electrically coupled to the TCM 104 by a harness or wire (not shown).

Transfer cases are known in the art as part of a four wheel drive system or all-wheel drive system. In the vehicle, the transfer case can be connected to the transmission and to the front and rear axles via drive shafts. In operation, the transfer case receives power from the transmission and transmits the received power to the front and rear axles. There are many types of transfer cases available, and for purposes of the present disclosure, any transfer case that couples to an automatic transmission output shaft can be used.

Figure 4:
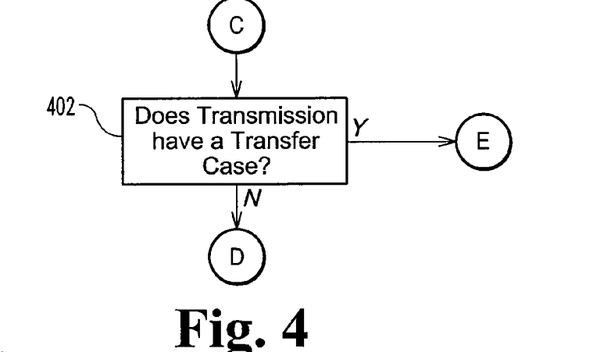
FIG. 4 is a flowchart of an embodiment for determining the configuration of a transmission.
Figure 6:
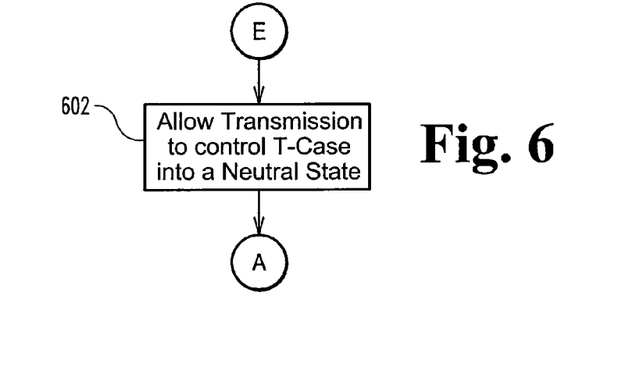
FIG. 6 is a flowchart of another embodiment for controlling the output of a transmission.

If, in block 402, it is determined by the TCM 104 that the transmission 102 includes a transfer case 148, the method 200 can proceed to block 602 in FIG. 6. The transfer case 148 presumably includes a separate and independent controller 152 that can communicate with the TCM 104. The transfer case controller 152 can control the transfer case 148 into a neutral state. While it is possible that the transfer case 148 can be controlled to neutral, this is not always advantageous because the TCM 104 is unable to control the vehicle speed in this condition. Rather, in this condition, the amount of power is reduced or relieved that is directed to the vehicle tires. If the vehicle is moving when the transfer case 148 shifts to neutral, the momentum of the vehicle is not instantaneously stopped. Thus, when an object is in the path of the moving vehicle, shifting the transfer case 148 to neutral may not prevent the vehicle from contacting the object.

Figure 5:
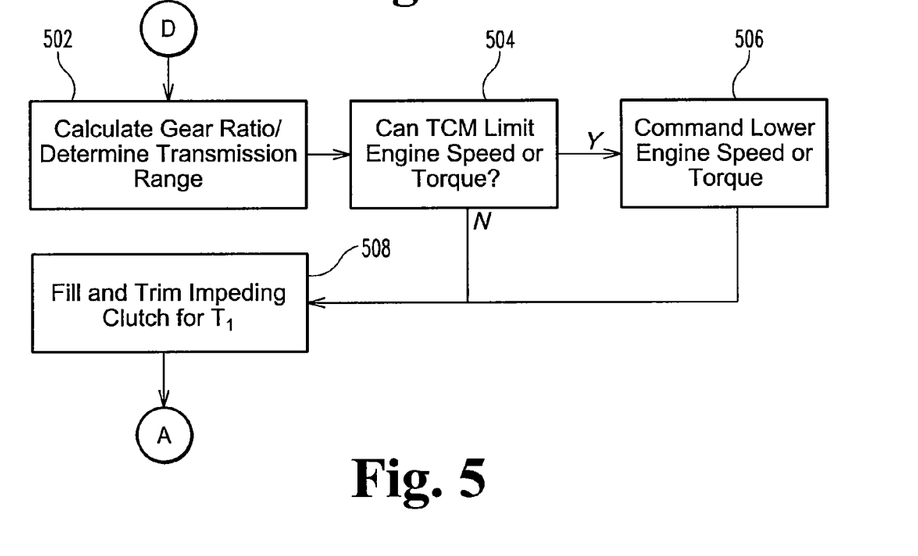
FIG. 5 is a flowchart of an exemplary embodiment for controlling the output of a transmission via a closed-loop obstacle-detecting software system with a transmission controller.

If it is determined in block 402 that the transmission 102 does not include a transfer case 148 or the transfer case is not shifted into a neutral state, the method 200 continues to block 502 where the transmission gear ratio is calculated (see FIG. 5). As described above, the gear ratio is determined by the ratio of the input speed to output speed or turbine speed to output speed. In the embodiment of FIG. 1A, the input speed sensor 126 can measure the transmission input speed and the output speed sensor 130 can measure the transmission output speed. The measured input and output speeds can be transmitted to the TCM 104, which can then calculate the gear ratio based on the two measurements.

Once the gear ratio is calculated, the method 200 proceeds to block 504 to determine whether the TCM 104 is capable of limiting engine speed or torque. As described above, in some embodiments, the TCM 104 can communicate with an engine controller ("ECM"). The TCM 104 can send commands or instructions to the ECM to control the engine output (i.e., speed or torque). For instance, the TCM 104 can limit engine torque by requesting a lower engine speed (e.g., 600 RPM) or torque (e.g., −3000 Nm) until a certain condition is met. Alternatively, if an engine is capable of making too much torque, the TCM 104 can request a torque limit in certain transmission ranges (i.e., gear ratios). Thus, if a vehicle is backing into a parking space and the proximity sensors on the rear bumper of the vehicle detect an object, the TCM 104 can request less engine speed or torque from the engine to help reduce the vehicle speed so that the vehicle avoids contacting the object. To do so, in block 506, the TCM 104 can send commands or instructions to the ECM to reduce engine speed or torque, which will effectively reduce transmission output as well. This can also be achieved by filling an impeding clutch and trimming an applied clutch in block 508, as described in further detail below.

If, in block 504, the TCM 104 cannot communicate with the ECM or is unable to limit engine speed or torque, method 200 proceeds to block 508. In block 508, the TCM 104 is able to control transmission output speed by commanding a normally-unapplied clutch to be at least partially applied (e.g., "filled") and a normally-applied clutch to be at least partially unapplied (e.g., "trimmed") over a period of time, $T_1$. In one exemplary embodiment, a transmission 102 can include several "gears" or "ranges" which are determined based on the ratio of the input to the output of the transmission. To achieve a certain range, one or more clutches are applied. For example, in an embodiment in which the transmission includes five different clutches and two clutches are applied for each attained range, a transmission can shift into another range by unapplying (i.e., trimming) one of the applied clutches and applying (i.e., filling) an unapplied clutch. The timing of filling the unapplied clutch with transmission fluid and trimming the applied clutch is controlled by the TCM 104. A properly controlled "fill and trim" cycle can enable the transmission to smoothly shift between ranges.

As described, the TCM 104 can control which clutches are applied and unapplied. In the previously-described embodiment, the output of the transmission can be locked or reduced when a third clutch is quickly applied. In some instances, when there is a high amount of torque passing through the transmission, applying a third clutch (e.g., bringing the clutch fully on) can lock the output and cause significant damage to the internal components of the transmission. Therefore, to safely reduce the output speed of the transmission, the clutch pressure in one of the two applied clutches is at least partially trimmed and the clutch pressure in one of the unapplied clutches is at least partially filled (hence, a third clutch is at least partially applied). In this embodiment, only one of the three applied clutches is at full pressure, whereas the other two clutches are at a partial or limited pressure. While this can lock the transmission output by not allowing the output shaft to rotate, the reduced clutch pressures can also reduce the amount of torque passing through the transmission. The normally-unapplied clutch (i.e., third clutch) that is at least partially filled can be referred to as an impeding clutch.

Again, the timing, $T_1$, of block 508 is important. In one embodiment, the filling and trimming of the impeding clutch can be completed within about 2 seconds. In another embodiment, the third clutch can begin impeding within about 1 second. In any event, block 508 can be completed within a few seconds. Since the amount of time for block 508 to be completed is quick, the transmission output can be stopped or substantially reduced such that the vehicle can either be stopped or its speed reduced substantially. Unseen objects that are in the path of the moving vehicle can be avoided by filling an impeding clutch in block 508.

Figure 8:
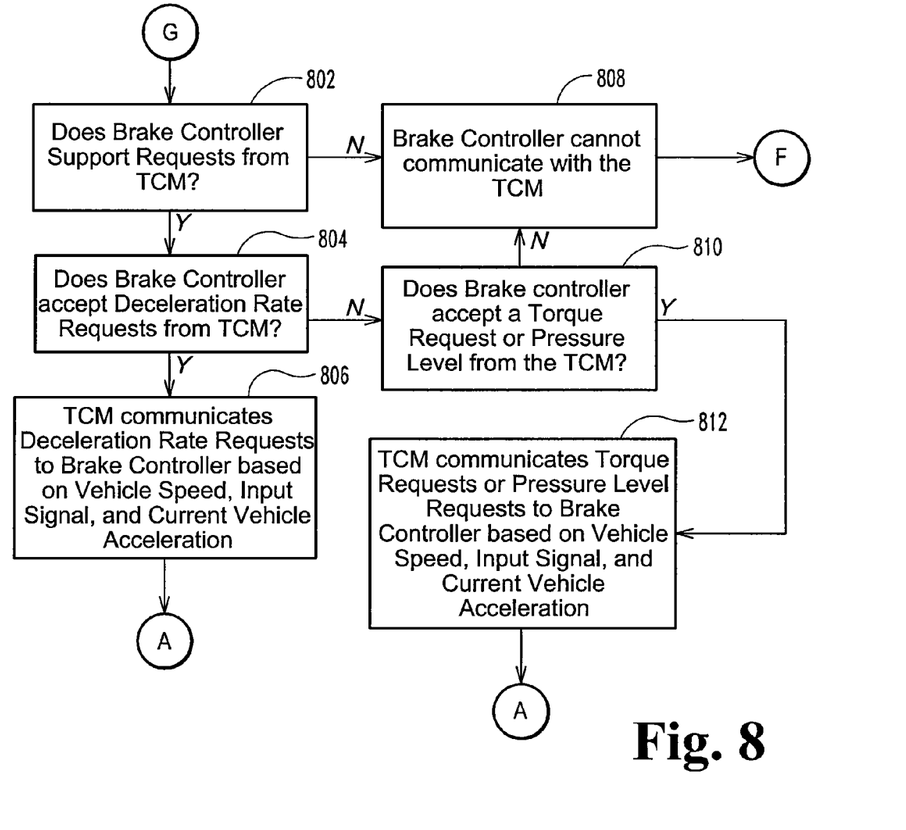
FIG. 8 is a flowchart of alternative embodiments for controlling the output of a transmission via a closed-loop obstacle-detecting software system with a transmission controller and brake controller.

Returning to FIG. 3, if in block 308 the TCM is able to communicate with the brake controller 142, method 200 proceeds to block 802. In FIG. 8, not only does the TCM 104 determine if it can communicate with the brake controller 142, but the TCM 104 also determines whether the brake controller 142 can accept instructions or requests therefrom. If the brake controller 142 does accept requests from the TCM 104, in block 804, the TCM 104 determines if the brake controller 142 accepts requests for deceleration rates. If the TCM 104 is able to send deceleration requests to the brake controller 142, then in block 806 the TCM 104 can control vehicle braking by communicating deceleration rates to the brake controller 142 based on vehicle speed, distance, and current vehicle acceleration. The distance is determined by the proximity sensor and communicated to the TCM 104. The TCM 104 can compute vehicle speed and acceleration or receive the data from the ECM. Thus, the vehicle speed can be controlled by the TCM 104 and brake controller 142.

In an exemplary embodiment, deceleration requests can be determined based on Proportional-Integral-Derivative (PID) control. For example, the TCM 104 can compute vehicle speed. If the vehicle speed is low, e.g., 10 mph, the TCM 104 can request a proportionally low deceleration rate to the brake controller 142. Alternatively, if the vehicle speed is high, e.g., 20 mph, the TCM 104 can request a proportionally higher deceleration rate to the brake controller 142. In turn, the brake controller 142 receives the deceleration rate request and adjusts the braking force or pressure on the vehicle tires.

In the event the TCM 104 determines that vehicle speed is changing, the TCM 104 is capable of differentially controlling the deceleration rate requests. For instance, if the vehicle speed is decreasing rapidly, the TCM 104 can reduce the clutch pressure of the impeding clutch. Likewise, if the vehicle speed is increasing rapidly, the TCM 104 can increase the clutch pressure of the impeding clutch. In addition, the TCM 104 may continue to incrementally increase the deceleration rate if there is no other way in which the vehicle is brought to a stopped position. This integral control allows the vehicle to be stopped when the vehicle is moving slowly.

PID control is only one exemplary way in which deceleration rate requests can be communicated from the TCM 104 to the brake controller 142 and/or transmission 102. There are other ways that one skilled in the art could communicate deceleration rates to the brake controller 142 and/or transmission 102.

In block 804, if the brake controller 142 does not accept deceleration requests from the TCM 104, method 200 proceeds to block 810. In block 810, a determination is made whether the brake controller 142 accepts requests regarding torque or pressure levels from the TCM 104. In the event the brake controller 142 does not accept torque or pressure level requests from the TCM 104, method 200 continues to block 808 to determine whether the TCM 104 can communicate with the brake controller 142 by another means. If it is determined that the brake controller 142 cannot communicate with or accept instructions from the TCM 104, then method 200 returns to step 702 (FIG. 7) and the brake controller 142 controls vehicle braking without receiving input from the TCM 104.

In a different embodiment, however, the brake controller 142 may be able to accept brake torque and/or pressure requests from the TCM 104. In this embodiment, method 200 proceeds to block 812. The TCM 104 receives input signals from the proximity sensor and calculates vehicle speed and acceleration (or, alternatively, receives the data from another source such as the ECM). Based on the current input signal, vehicle speed, and vehicle acceleration, the TCM 104 communicates brake torque or pressure levels to the brake controller 142 to control vehicle braking.

Based on instructions or requests sent by the TCM 104 to the brake controller 142, the vehicle speed can be controlled so that unseen objects and the like can be avoided by a moving vehicle. The conditions set forth in blocks 202, 204, 206, and 208 are constantly being monitored by the TCM 104. If one of these conditions is suddenly not met, method 200 terminates and is disabled until all of the conditions are satisfied. For example, if the driver suddenly presses the accelerator pedal and the throttle exceeds the value of "Thresh1," the TCM 104 determines that the method 200 is no longer desired and is therefore disabled. In addition, method 200 is one of many programs or routines that the TCM 104 performs. Thus, under certain circumstances, other programs or routines may require the transmission to perform in a manner that disables or terminates method 200. Under these circumstances, the TCM 104 continues to test the conditions set forth in blocks 202, 204, 206, and 208, but the TCM 104 also performs other programs or routines.

Although not shown as part of method 200, when the TCM 104 is able to limit engine speed or engine torque in block 504 (FIG. 5), it may also be able to request to the ECM to shut off the engine (i.e., shut off the ignition). While this may be less preferable and only used under emergency conditions, it is another possible communication or request that the TCM 104 can make to the ECM when controlling vehicle braking.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of using a transmission to inhibit a moving vehicle from contacting an object in the path of the moving vehicle, the transmission having a transmission controller and a transmission output speed sensor and the vehicle having a proximity sensor, an engine having an engine speed, an engine controller configured to control the engine speed, and the engine coupled to the transmission, the method comprising:
(a) determining whether a user input switch is enabled;
(b) receiving a signal from the proximity sensor and comparing the signal to a signal threshold;
(c) measuring a transmission output speed with the transmission output speed sensor and comparing the measured transmission output speed to an output speed threshold;
(d) receiving a throttle percentage with the transmission controller and comparing the received throttle percentage to a throttle threshold;

(e) enabling a vehicle speed assistance program for controlling vehicle speed by the transmission controller if (i) the user switch is enabled, (ii) the signal satisfies the signal threshold, (iii) the transmission output speed is less than the output speed threshold, and (iv) the throttle percentage is less than the threshold percentage;

controlling the transmission by engaging at least two of a plurality of clutches to an engaged clutch pressure and disengaging at least one of the plurality of clutches to a disengaged clutch pressure, where each of the plurality of clutches is operably controlled at a clutch pressure between its respective disengaged clutch pressure and its engaged pressure;

executing the vehicle assistance program if the program is enabled in step (e);

operably controlling vehicle sped with the transmission controller by reducing the clutch pressure of one of the at least two engaged clutches to a clutch pressure less than its engaged clutch pressure and greater than its disengaged clutch pressure, increasing the clutch pressure of the at least one disengaged clutch to a clutch pressure greater than its disengaged clutch pressure and lesser than its engaged clutch pressure, and maintaining another of the at least two engaged clutches at its engaged clutch pressure; and reducing vehicle speed with the transmission controller to inhibit movement of the vehicle.

2. The method of claim 1, wherein when the user input switch is determined to be enabled, at least one of steps (b)-(d) is completed.

3. The method of claim 1, wherein if the user input switch is determined to be disabled, steps (b)-(e) are not completed.

4. The method of claim 1, further comprising determining a distance between the moving vehicle and the object with the proximity sensor.

5. The method of claim 1, further comprising determining whether the vehicle has a brake controller.

6. The method of claim 5, wherein the directly controlling step comprises determining whether the transmission controller or the brake controller has priority over controlling vehicle speed, wherein the transmission controller is configured to control the vehicle speed through independent control of the transmission without reducing the engine speed and the brake controller is configured to control vehicle speed through application of a vehicle brake.

7. The method of claim 6, further comprising sending commands from the transmission controller to the brake controller for controlling vehicle speed.

8. The method of claim 7, wherein the commands comprise deceleration rate requests, torque level requests, or pressure level requests.

9. The method of claim 8, wherein the commands depend on the values of vehicle speed, the received signal, and vehicle acceleration.

10. The method of claim 1, further comprising calculating the transmission gear ratio.

11. The method of claim 10, further comprising determining whether the transmission controller can limit input speed or input torque of the transmission provided by the engine to the transmission through communication with an engine controller.

12. The method of claim 11, wherein when the transmission controller can limit input speed or input torque, a signal is sent to the engine controller by the transmission controller to lower the input speed or input torque.

13. The method of claim 1, further comprising determining if the transmission has a transfer case.

14. The method of claim 13, wherein when the transmission has a transfer case, step (e) comprises controlling the transfer case into a neutral condition.

15. The method of claim 1, wherein step (e) is not performed if the signal exceeds the signal threshold or the measured transmission output speed exceeds the transmission output speed threshold.

16. A method of controlling vehicle speed of a vehicle with a transmission controller, the vehicle having a proximity sensor, an engine for providing power, and a transmission coupled to the engine, the transmission including a plurality of clutches, an output speed sensor for detecting transmission output speed and the transmission controller for controlling the transmission, the method comprising:

operating the transmission with at least two of the plurality of clutches engaged and at least one of the plurality of clutches disengaged, where each of the plurality of clutches is operable between a disengaged clutch pressure when the clutch is disengaged and a full clutch pressure when the clutch is engaged;

executing a program to determine whether to enable a vehicle speed assistance program for controlling vehicle speed, the executing step comprising:

measuring the transmission output speed with the transmission output speed sensor and comparing the measured transmission output speed to a transmission output speed threshold at the transmission controller;

receiving a throttle percentage with the transmission controller and comparing the throttle percentage to a throttle threshold;

receiving an input signal directly from the proximity sensor at the transmission controller and comparing the input signal to a signal threshold;

enabling the vehicle speed assistance program if transmission output speed is less than the transmission output speed threshold, the throttle percentage is less than the throttle threshold, and the input signal satisfies the signal threshold;

executing the vehicle speed assistance program with the transmission controller by:

reducing the clutch pressure of one of the at least two engaged clutches to a clutch pressure between its full clutch pressure and its disengaged clutch pressure;

increasing the clutch pressure of the at least one disengaged clutch to a clutch pressure between its disengaged clutch pressure and its full clutch pressure; and reducing the output speed of the transmission by the transmission controller when at least one of the plurality of clutches is at its full clutch pressure and at least two of the plurality of clutches is at a clutch pressure between their respective disengaged clutch pressure and full clutch pressure.

17. The method of claim 16, further comprising:
locking an output of the transmission; and
reducing vehicle speed until the vehicle is not moving.

18. The method of claim 16, further comprising executing the reducing and increasing the clutch pressure steps within a time period.

19. The method of claim 18, wherein the time period is less than two seconds.

20. The method of claim 16, further comprising:
detecting an object with the proximity sensor that is located within a path of movement of the vehicle;
communicating from the proximity sensor to the transmission controller a distance between the vehicle and the object; and executing the reducing the output speed of the transmission step with the transmission controller to avoid contact between the vehicle and the object.

21. The method of claim 16, further comprising determining if a user input switch is activated, wherein the user input switch is configured to enable and disable the vehicle speed assistance program.

22. The method of claim 21, wherein if the user input switch is deactivated, the vehicle speed assistance program is disabled.

23. The method of claim 21, wherein the enabling the vehicle speed assistance program step is not performed until the user input switch is activated.

24. A method of controlling vehicle speed of a vehicle with a transmission controller, comprising:
   providing a proximity sensor, an engine for providing power, and a transmission coupled to the engine, the transmission including a plurality of clutches controllable at a clutch pressure between a disengaged clutch pressure and an engaged clutch pressure, an output speed sensor for detecting transmission output speed and the transmission controller for controlling the transmission;
   operating the transmission with at least two of the plurality of clutches engaged at their respective engaged clutch pressure and at least one of the plurality of clutches disengaged at its respective disengaged clutch pressure;
   executing a program to determine whether to enable a vehicle speed assistance program for controlling vehicle speed, the executing step comprising:
      determining if a user input switch is activated;
      measuring the transmission output speed with the transmission output speed sensor and comparing the measured transmission output speed to a transmission output speed threshold at the transmission controller;
      receiving a throttle percentage with the transmission controller and comparing the throttle percentage to a throttle threshold;
      receiving an input signal directly from the proximity sensor at the transmission controller and comparing the input signal to a signal threshold;
   enabling the vehicle speed assistance program if the user input switch is enabled, transmission output speed is less than the transmission output speed threshold, the throttle percentage is less than the throttle threshold, and the input signal satisfies the signal threshold;
   executing the vehicle speed assistance program with the transmission controller by:
      reducing the clutch pressure of one of the at least two engaged clutches to a clutch pressure between its engaged clutch pressure and its disengaged clutch pressure;
      increasing the clutch pressure of the at least one disengaged clutch to a clutch pressure between its disengaged clutch pressure and its engaged clutch pressure; and
      reducing the output speed of the transmission by the transmission controller when at least one of the plurality of clutches is at its full clutch pressure and at least two of the plurality of clutches is at a clutch pressure between their respective disengaged clutch pressure and full clutch pressure.

25. The method of claim 24, further comprising:
   locking an output of the transmission; and
   reducing vehicle speed until the vehicle is not moving.

26. The method of claim 24, further comprising executing the reducing and increasing the clutch pressure steps within a time period.

27. The method of claim 26, wherein the time period is less than two seconds.

28. The method of claim 24, further comprising:
   detecting an object with the proximity sensor that is located within a path of movement of the vehicle;
   communicating from the proximity sensor to the transmission controller a distance between the vehicle and the object; and
   executing the reducing the output speed of the transmission step with the transmission controller to avoid contact between the vehicle and the object.

* * * * *